Oct. 8, 1957
E. L. HARDER
2,809,330
SELF-TRIP CIRCUIT BREAKER
Filed July 21, 1953
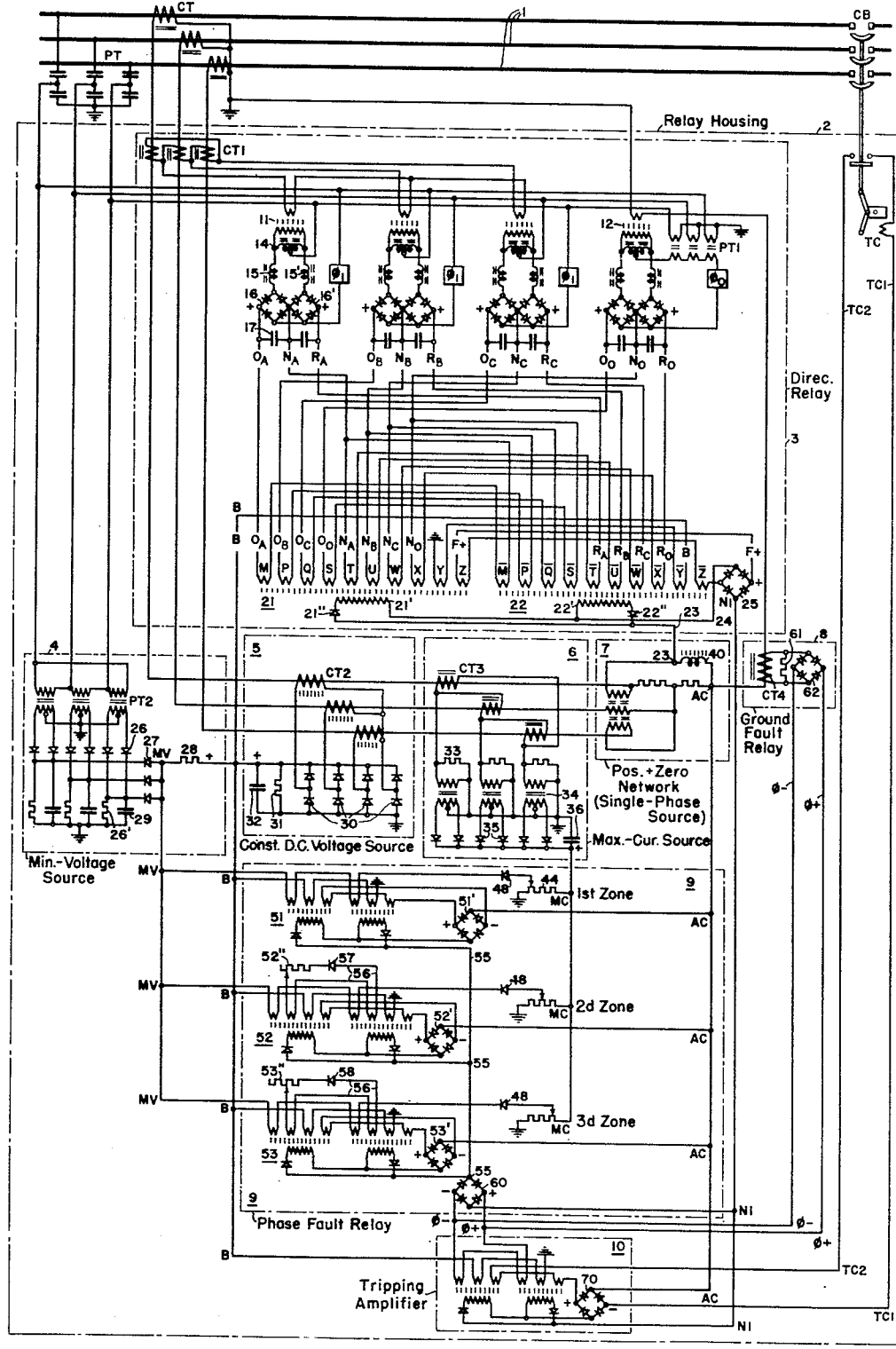

2,809,330

SELF-TRIP CIRCUIT BREAKER

Edwin L. Harder, Pittsburgh, Pa., assignor to Westinghouse Electric Corporation, East Pittsburgh, Pa., a corporation of Pennsylvania Application July 21, 1953, Serial No. 369,371

13 Claims. (Cl. 317—36)

My invention relates to self-trip circuit breakers, which include, or are associated with, a self-contained, completely line-energized, static protective relaying equipment, for protecting a power-line against faults.

Protective relaying systems, such as are used for practically all modern high-voltage lines, require quite a number of items, all of which must be in working order, in order to isolate a fault on the power-line. These items include the power-line circuit breaker with its trip-coil, current transformers, potential transformers or devices, secondary wiring and fuses, protective relays, a battery, and direct-current control-circuits including breakers or fuses.

My present invention relates to an equipment which is all self-contained, and which may be disposed within the circuit breaker, but which may also be weather-resistant so that it can be mounted outdoors near the circuit breaker. It has the requisite accuracy for fault-detection. It uses line-derived power for tripping, and for supplying all requisite control-power for the various elements of the equipment. If there is fault-current, there is sufficient power.

My self-contained equipment preferably uses means for achieving fault-discrimination at a low energy-level, using potential which is obtained from a bushing potential-tap by a greatly simplified arrangement which is possible because of the low energy-requirements, and using current from bushing current-transformers. Because of the low energy-level, the need for secondary fuses can be avoided, and the secondary wiring can be much simplified, or some of it may even be printed.

My system preferably uses static devices throughout, thereby obviating the friction-losses and maintenance-requirements which are associated with the moving parts of conventional mechanical relays, with their need for contact-setting adjustments. Since my equipment is entriely static, it needs no periodic adjustment, it can be enclosed in a weatherproof housing of its own, or it may be completely embedded in plastic, except for distance-setting adjustments and time-adjustments.

Instead of using elements which have mechanically moving switch-contacts or relaying-contacts, I use static "yes-no" devices, which either substantially block or permit a material current-flow from a self-contained energy-source which derives its energy from the protected power-line. There are at least three such forms of static switching-devices, namely, tubes, transistors, and valve-type magnetic amplifiers.

In some of the broader aspects of my invention, tubes can be used for some of the elements of my equipment, but it is frequently desirable to avoid the use of tubes, because of their relatively short life, their frangibility, their requirement for an evacuated housing or envelope, and their requirement for a heat-activated electron-emitter, which involves the necessity for a filament-supply. Tubes also usually involve a certain small warm-up time. A more particular object of my invention, therefore, is to preferably provide equipment which includes only reliable long-life control-devices, of types which are independent of either moving parts, evacuated housings, or heat-activated electron-emitters.

Transistors, or static semiconducting devices, can be used, theoretically, in any place or circuit where a tube can be used, except that transistors, as now known, in the very infancy of their development, are limited to output-powers which are much too small for even the most low-powered of trip-coils, thus requiring that a number of such transistors should be connected in parallel with each other, in order to control the necessary amount of tripping-power. In some of the broader aspects of my invention, however, I contemplate the use of transistors for my static switching-devices.

In the form of my invention which is at present preferred, I prefer to use saturable magnetic amplifiers as my static switching-devices, particularly magnetic amplifiers of the relay-type, which are characterized by having an external feed-back circuit for triggering the magnetic amplifier in response to a predetermined magnitude and/or polarity of control-voltage. These magnetic amplifiers require a source of fairly constant single-phase voltage, for their main or controlled output-circuits. They also require a biasing-means, for preventing self-triggering because of self-saturation, and this biasing-means requires a fairly constant unidirectional biasing-voltage source. According to my invention, I provide completely line-energized static means for providing both this single-phase source and this biasing-voltage source. If such a magnetic amplifier is used for second or third-zone protection, it needs certain backup time-delay means, as is well known in the protective relaying art, and I prefer to provide such time-delay means, in the form of a closed damper-coil control-circuit, including an impedance suitable for delaying the flux-changes in the magnetic amplifier for a time suitable for said backup timing.

In the case of protective relaying equipment, or breaker-tripping equipment, using magnetic amplifiers, it may be that sufficient tripping-power can be controlled, by a single magnetic amplifier, to accomplish the required breaker-tripping function. It is frequently desirable, however, even when magnetic amplifiers are used, to perform the fault-discriminating functions on a much lower energy-level, and to use a suitable static amplifying-means, or "yes-no" apparatus, for either blocking or permitting the flow of a material current in a trip-circuit having a considerably higher energy-level.

Since most of the power-lines of this country are polyphase lines, the most important fields of application of my invention are in the protection of such lines against line-faults, or the tripping of the circuit-breakers which are associated with such lines.

In the general case of power-line fault-protection, it is necessary to provide both directional elements, (which are responsive to a predetermined direction of the line-currents), and impedance or reactance elements, (which respond to the line-impedance when said impedance falls below a predetermined value), and it is in general necessary to effect these responses for any one of the ten kinds of faults which are possible on such lines, namely, the three kinds or phases of line-to-ground faults, the three double line-to-ground faults, the three line-to-line faults, and the three-phase fault. The protective relaying art has developed many different kinds of equipments for coping with these ten kinds of faults, and also for providing backup protection, usually in the form of second and third-zone elements, which are added to the prime line of defense in the form of the first-zone elements. It is within the capabilities of my invention to provide all of this protection, in self-contained, completely line-energized, static relaying-elements.

With the foregoing and other objects in view, my invention consists in the general and specific combinations, systems, circuits, apparatus, parts, and methods of design and operation, as hereinafter described, and illustrated in the accompanying drawing, the single figure of which is a diagrammatic view of circuits and apparatus, illustrating the general principles of my invention, and also showing an example of a specific form of embodiment using saturable magnetic amplifiers as the static switching-means which are provided.

In the drawing, I have illustrated my invention as being applied to a three-phase power-line or circuit 1, which is connected to the breaker-terminals of a three-phase circuit breaker CB, which is diagrammatically illustrated as comprising a trip-coil TC, which is intended to represent any electrically controlled tripping-mechanism or series of tripping mechanisms, preferably of a type requiring the minimum possible electrical energy to initiate a tripping operation. For deriving the line-current and the line-voltage, for relaying purposes, I show a line current transformer CT, which may be bushing transformers associated with the insulating bushings of the circuit breaker CB, and a line potential transformer PT, which may be tapped bushings of the circuit breaker CB, or other tapped capacitor potentiometers, particularly in case of a high-voltage line. These showings are intended to be general, and symbolic of any suitable means for the purposes in question.

I have illustrated my protective relaying equipment, for protecting the power-line 1 against faults, as being enclosed within a relay-housing of its own, as indicated by chain-lines 2, and this illustration is intended to symbolically represent any self-contained structure, which may be either disposed within the circuit breaker CB, or, if the circuit breaker has a separate structure for each of the three phases, the relaying equipment may be disposed nearby, or at any convenient point. The relay equipment can be in a weatherproof housing 2, for outdoor mounting, or, since the relaying equipment consists solely of long-life static elements, these elements can be permanently embedded in plastic, in which case the chain-lines 2 would represent the outer surface of the plastic.

It is an important feature of my invention that the relaying equipment, which is enclosed within the housing 2, shall be completely line-energized, so as to require no battery-terminals to be brought into the relay housing 2 or into the housing of the circuit breaker CB. Batteries require maintenance, and hence are foreign to the object of my invention, which is to provide a self-maintained protective equipment or breaker-tripping equipment. The relay housing 2 may, or may not, include the tripping equipment for the circuit breaker CB. Perhaps, in the general case, the relaying housing will not house the trip-coil TC of the breaker, but will have external trip-coil terminals TC1 and TC2 which lead out of the relay housing, for tripping purposes. For convenience in illustration, the housing has been indicated as including the tripping mechanism, but it is to be understood that I am not limited to this detail, or even to the detail of having an all-inclusive relay housing at all.

As an alternative, the several parts of the relaying equipment can each be separately housed or packaged, as indicated, for example, by the chain-line packages. In the illustrated form of embodiment of my invention, these chain-line packages indicate, respectively, a directional relaying element or means 3, a minimum-voltage network or source 4, a constant direct-current voltage-network or source 5, a maximum-current network or source 6, a phase-sequence network which is used as a constant-voltage single-phase source 7, a ground-fault relay 8, a phase-fault relay or distance-element 9, and an amplifier 10 for supplying the tripping-energy. It is to be understood that the precise numbers and natures of these parts are subject to considerable variation, and that the particular relaying system which has been chosen as an illustrative embodiment of my invention, is subject to a very considerable variation, so as to embody any of the large number of forms of protective relaying equipments, which are known in the art. The essential thing, which distinguishes the broadest aspects of my invention from the prior art, is the use of a self-maintained, completely line-energized, all-static, relaying or tripping assembly.

For the directional relay 3, for example, there are many known directional-relay means, which can be chosen or adapted for the energization of static control-devices. Among the many such means, which could be mentioned, are included a wattmetric response, a phase-comparison system wherein positive half-waves of the line-current are compared with negative half-waves of the line-voltage, or various differential or wattmetric responses wherein a vector-sum of a line-current and a line-voltage, with suitable phase-shaft, may be compared with, or opposed by, or multiplied by, a vector-difference of the same quantities, with the same or a different phase-shift. I have chosen to illustrate a form of the vector-sum and difference system, for my directional relay 3, in accordance with Fig. 4 of a Goldsborough Patent 2,545,995, granted March 20, 1951.

Thus, in the illustrated directional-relay equipment 3, I use an auxiliary current transformer CT1, which supplies the three delta line-currents to three single-phase auxiliary current-transformers 11, which may be saturable, in order to protect the equipment against excessive fault-currents, as pointed out in the Goldsborough patent. There is also a fourth single-phase auxiliary current-transformer 12, which is energized from the neutral return-lead of the line current transformers CT. It will be understood that these transformers 11 and 12 can be suitably weighted or proportioned, so as to respond to desired critical fault-values of the phase-faults and ground-faults respectively.

Vectorially added to voltage-drops measured by the respective secondary currents of these four individual saturating 11 and 12, are suitable line-voltages, the phase-voltages being taken directly from the tap-terminals of the potential transformer PT, while the residual or zero-sequence voltage, for cooperation with the ground-fault transformer 12, may be taken from a set of open-delta auxiliary potential transformers PT1. As explained in the Goldsborough patent, these line-voltages are introduced noninductively, by means of the mid-taps of balance-coil reactors 14 which are connected across the secondary terminals of the several individual current-transformers 11 and 12. Suitable phase-shifting means may also be used, for controlling the relative phases between the vectorially combined current-responsive voltage-drops and line-voltages, as indicated by the phase-voltage phase-shifters $\phi_1$ and the residual-voltage phase-shifter $\phi_0$. Each of the four circuits for the vectorially combined current-responsive voltage drops and line-voltages includes a pair of serially connected reactors 15, 15′, and a pair of rectifier bridges 16, 16′, respectively, so that the direct-current output-terminals of the pairs of rectifier-bridges will contain voltages proportional to the magnitudes of the sum and difference, respectively, of the several pairs of vectorially combined current-responsive voltage-drops and line-voltages. The outputs of the bridges 16 and 16′ can be smoothed of ripples, by means of capacitors 17, or the like, when required.

Each pair of the rectifier-bridges 16, 16′, in the illustrated directional relaying equipment 3, has two positive output-terminals, which are designated by the letters O and R, for energizing certain operating-coils and restraint-coils, respectively, and a common negative terminal, which is designated by the letter N. Subscripts A, B, and C are added, to indicate the several line-phases, and the subscript 0 is added, to indicate the zero-sequence quantity, for responding to ground-faults. This directional-relay system operates by opposing the operating-coil force of each pair, by the restraint-coil force of that same pair. In the event of a fault, the faulted phase or zero-sequence circuit, as the case may be, carries the larger currents, and hence the directional response which it provides prevails over the directional responses of the unfaulted circuits.

In accordance with my invention, I use a number of static "yes-no" control-devices, or devices which will either substantially block a material current-flow in a circuit, or permit the same, in response to a critical magnitude and/or polarity of a control-force or current or magnetization, which is applied thereto. As pointed out in the preliminary remarks, there are at least three such types of static control-devices, and I may use any one of them, or I may use one type for one portion of my entire equipment, and another type for another portion thereof. For the reasons stated, however, I prefer to use magnetic amplifiers, each of which consists of two saturable reactors, coupled so as to be noninductively related to each other, so far as their control-circuits are concerned, and triggered so that they will respond to a critical value and/or magnitude of the controlling-current, or the controlling magnetomotive force, so as to change from an unsaturated state to a saturated state, in response to this critical magnitude. I have, therefore, chosen to illustrate magnetic amplifiers throughout, in my protective relaying equipment, wherever a "yes-no" response is required, with the understanding, of course, that, in some of the broader aspects of my invention, and while advantages are to be had by using such an equipment, I am not altogether limited to such a choice.

My directional-relaying equipment 3 embodies such a magnetic amplifier, and specifically, a valve-type or relay-type of magnetic amplifier, which is one which has an external feed-back for triggering the same, in response to a critical value of the control-quantity. The magnetic amplifier of the directional relay 3 consists of two saturable reactors 21 and 22. The two alternating-current windings 21' and 22' of these saturable reactors, are connected in parallel with each other, through oppositely directed contact-rectifiers 21'' and 22'', for providing a certain amount of so-called self feed-back, as is well understood in the magnetic-amplifier art. These two parallel-connected alternating-current windings 21' and 22' are serially connected in an alternating-current supply-circuit 23 and 24, which will be subsequently described, so that the alternating current which is supplied by this circuit will be passed or blocked, according to the condition of saturation of the magnetic amplifier.

The saturable reactor 21 is shown as having eight control-coils, lettered M, P, Q, S, T, U, W and X, and also a bias-coil Y, and an external-feed-back coil Z. The other saturable reactor 22 has similar coils, which are distinguished by bars over the respective designating-letters. The two saturable reactors 21 and 22 are shown as having their corresponding control-coils, bias-coils and external-feed-back coils serially connected with each other, in accordance with a known practice in the magnetic-amplifier art. Eight control-coils are needed, because there are four pairs of control-circuits, which are furnished by the four pairs of rectifier-bridges 16, 16'. Thus, for example, in the event of a phase A fault, the operating coils M and $\overline{M}$ will produce a saturation-inducing magnetization which is larger than the corresponding restraint-coils T and $\overline{T}$, respectively, and hence a triggering operation will be produced, which initiates saturation in the respective saturable reactors 21 and 22.

The bias-coils Y and $\overline{Y}$ of the magnetic amplifier 21, 22 are energized from a substantially constant-voltage direct-current circuit B, to prevent self-triggering because of self-saturation, as is known in the magnetic-amplifier art.

The external-feed-back coils Z and $\overline{Z}$ of the magnetic amplifier 21, 22 are energized with direct current, from a conductor F+, in response to the amount of alternating current which is permitted to flow in the alternating-current circuit 23—24 of the magnetic amplifier, in accordance with a known practice. Thus, in the illustrated circuit, the alternating-current circuit or conductor 24 is connected to one of the alternating-current terminals of a rectifier-bridge 25, and the other alternating-current terminal of this bridge constitutes the return-circuit N1 for the substantially constant-voltage single-phase supply-source which will be subsequently described. The two direct-current terminals of the rectifier-bridge 25 are connected to the external-feed-back coils Z and $\overline{Z}$, the positive terminal of which is indicated at F+.

By the foregoing means, the return circuit N1 of the single-phase supply-means is in effect disconnected from the alternating-current terminal 23, when the directional-relay magnetic-amplifier 21—22 is in its normal unsaturated state, while this connection is in effect completed when said magnetic amplifier is saturated.

In my illustrated apparatus, the minimum-voltage source 4 and the maximum current source 6 are needed, in order to energize the particular type of phase-fault relay 9 which I have chosen for illustration. The constant direct-current voltage-source 5, or some such equivalent source, is needed in order to supply the biasing power which is required by the magnetic amplifiers which are chosen as the preferred type of static switching-devices which are to be used. This constant direct-current voltage-source 5, or its equivalent, is also needed, in connection with the particular type of minimum-voltage network 4, which is illustrated. The phase-sequence network 7, or some similar source of alternating current which has an operative magnitude, preferably a fairly constant magnitude, whenever fault-current exists, is needed in order to supply the alternating current which is either substantially blocked or permitted to flow, according to the reluctance of the various saturated magnetic amplifiers which are used in my device.

In the minimum-voltage network 4, I have chosen to show a known type of network for this purpose, using a set of auxiliary potential transformers PT2, having secondary windings which produce voltages which are insulated from line potential transformer PT, and the mid-taps of these secondary windings are grounded. The outputs of the three secondary windings of these auxiliary potential transformers PT2 are rectified, through contact-rectifiers 26, to provide three rectified voltages, which appear across resistors 26', and which are respectively subtracted from a positive minimum-voltage direct-current bus MV, by means of three contact-rectifiers 27, so as to pull down the voltage of this minimum-voltage direct-current bus MV to a direct-current voltage-value corresponding to the smallest one of the three-line-voltages. The minimum-voltage direct-current bus MV is energized from the constant-voltage direct-current bus B, through a resistance 28. The minimum-voltage bus MV thus has a direct current voltage to ground, proportional to the smallest of the three line-voltages. It is usually desirable to smooth out the several rectified line-voltages by means of filter-capacitors 29, or the like.

The constant-voltage direct-current source 5 may either be a separate instrumentality, as shown, or it may derive its energy from the constant-voltage single-phase source 7. I have preferred to illustrate a separate unit for the constant-voltage direct-current source 5. It is energized through saturable auxiliary current-transformers CT2. The currents in the three phase-terminals and in the neutral terminal of these auxiliary current-transformers CT2 are separately rectified, as by contact-rectifiers 30, and the rectified outputs are connected in parallel with each other, across a ballast-resistance 31 and a filter-capacitor 32. The positive terminal of these rectified currents, (which are transformed into voltages by the saturation of the auxiliary current-transformers CT2), is connected to the constant-potential direct-current bus B, while the negative terminal is grounded, as shown, thus producing, in the bus B, a direct-current voltage which has an adequate or operative magnitude, preferably approximately constant, whenever one of the three line-currents or the zero-sequence neutral or ground-current is of a predetermined fault-magnitude, such for example, as a 0.5 ampere ground-current, or a three ampere phase-current, or any other critical relationship.

The maximum-current network 6 is a known device, which is energized from three non-saturated auxiliary current-transformers CT3, the outputs of which are separately loaded through ballast-resistors 33, to transform the several currents into voltages, which are again transformed by auxiliary voltage-transformers 34, the outputs of which are respectively rectified, at 35, and connected in parallel, so as to energize a positive direct-current maximum-current bus MC, which thus has a direct-current voltage to ground, which is proportional to the maximum phase-current of the line. It is usually desirable to filter the ripples in this direct-current maximum-current bus MC, through a filter-capacitor 36.

For the single-phase source 7, any suitable device may be used, which will produce a reliable source of single-phase power, of acceptable or operative magnitude, preferably a fairly constant magnitude, whenever there is any line-fault, of any description, to which my apparatus is intended to be responsive. Any means which will achieve such a result may be used. I have chosen to illustrate, as a simple and certainly acceptable means for this purpose, a particular type of sequence-network, which is known, which provides a single-phase output-voltage in accordance with the weighted sum of the positive and zero-sequence current-components, so as to produce a voltage which is always available, whenever the protected power-line 1 experiences a fault of any one of the ten different kinds to which three-phase lines are susceptible. The single-phase output-terminals of the sequence-network 7 are indicated at AC and 23 respectively, and these terminals are loaded by a saturable reactor 40, which serves to hold the single-phase output to an approximately constant magnitude, which is controlled by the saturating-point of the reactor 40.

The phase-sequence network which is shown in the element 7 is a well-known network which is shown and described in my Patent 2,183,646, granted December 19, 1939, in view of which it is believed that no further detailed description is required here, particularly in consideration of the additional fact that any network which produces a single-phase relaying-quantity, whenever there is any kind of fault on the protected line, will suffice for my purpose.

The phase-fault relay 9 is illustrated as a three-zone affair, so as to give complete protection, covering all three of the distance-zones which are commonly used in distance-type relaying, such as impedance or reactance relays. It will be understood, of course, that I could, if desired, use only one of these three zones in my self-contained, completely line-energized, relaying or tripping equipment.

Thus, I could use my equipment as a sort of backup protection, selective with the protection of adjacent line-sections, but providing backup protection for controlling the operation of the particular circuit breaker CB, to provide against every contingency except the failure of the breaker proper, thus protecting against the several vulnerable items which were mentioned in the beginning of this description. In this way, my completely line-energized relaying equipment could be used to back up other conventional relays which would be provided for controlling the circuit breaker CB.

On the other hand, I could use only the first-zone protection in my equipment, thus replacing all conventional mechanical relays for this primary protection, and leaving the second and third-zone protection, if any such additional protection is needed, to the service of a conventional relaying system, or a relaying system using a communicating-channel such as carrier current, micro-wave equipment, a leased telephone-line channel, or a pilot wire.

The phase-fault relaying equipment 9 is essentially a phase-fault distance-responsive equipment, of which there are many known types, some types operating on a phase-selector system, for selecting the faulted phase or circuit, some operating on the product-type or wattmetric principle, some operating on the differential or balance-beam principle, some operating on the phase-sequence principle for producing a single phase line-current and a single line-voltage for any one of a plurality of different kinds of faults, and some operating on perhaps other principles.

I have chosen, as a simple illustrative device 9, for this distance-relaying purpose, a relay which operates in response to the maximum line current, and the minimum line-voltage, which thus picks out the current and the voltage of the faulted phase, in the event of a phase-fault on the protected power-line. For the three protection-zones, I tap off suitable proportions of the direct-current voltage to ground, which is provided with the maximum-current bus MC, using, for this purpose, suitable potentiometers 44. I subtract, from the tapped-off maximum-current voltage, the direct-current voltage to ground, which is provided by the minimum-voltage bus MV, using a serially connected contact-rectifier 48 to provide against the contingency that the voltage of the minimum-voltage bus MV might be larger than the tapped-off voltage of the maximum-current bus MC.

I then use this differential current-minus-voltage-responsive voltage, in the circuits containing the aforesaid rectifiers 48, to energize the control-coils of a series of three magnetic amplifiers 51, 52 and 53, for the first, second and third-zone protection, respectively. Since magnetic amplifiers are well known, and since a magnetic amplifier has already been described in some detail, in connection with the element 21—22 of the directional relay 3, no more description is believed to be needed, except to point out that, instead of having eight control-coils on each of the saturable reactors, the magnetic amplifiers 51, 52 and 53 have only one, which is the common form of construction for magnetic amplifiers. It may be pointed out that each of the magnetic amplifiers 51, 52 and 53 has its own rectifier bridge 51', 52' and 53', respectively. Each of these three magnetic amplifiers 51, 52 and 53 has an alternating-current output-circuit or controlled-circuit, which is energized from the single-phase bus AC, through its own rectifier-bridge 51', 52' or 53', and through its two parallel-connected alternating-current windings, and thence to a common conductor 55, which thus conducts an alternating current in the event that any one of the three magnetic amplifiers 51, 52 or 53 is saturated as a result of a critical current-energization in its control-circuit.

It is desirable that the second and third-zone distance-responsive elements shall have time-delays of increasing magnitudes, to coordinate the fault-protection control with the control-means for circuit-breakers at other points along the power-line, as is well understood in the protective relaying art. In my second and third-zone phase-fault magnetic amplifiers 52 and 53, I therefore provide a convenient time-delay means for producing the required time-delays. For this purpose, I may provide control-coils which are included in a closed damper-coil control-circuit 56, which includes a damping-resistance 52" or 53", respectively, according to the amount of damping that is required. In this manner, when the saturating flux starts to build up in either one of the magnetic amplifiers 52 or 53, a counter magnetomotive force is built up in the damper-circuit, which delays the building up of the saturation of these amplifiers, for a time which is controlled by the magnitude of the damping-resistance 52" or 53", respectively. In order to avoid any delay in the resetting of the magnetic amplifier (at which time it is desirable that the amplifier should return, without delay, from its saturated condition to its normal unsaturated condition), the damper-coil control-circuits 56 may serially include contact-rectifiers 57 and 58, in addition to the damping-resistors 52" and 53", respectively.

The common alternating-current terminal 55 of the three phase-fault magnetic amplifiers 51, 52 and 53 is connected to one of the alternating-current terminals of a rectifier bridge 60, and the other alternating-current terminal of this bridge is connected to the single-phase return-circuit N1. This rectifier-bridge 60 has positive and negative direct-current output-terminals $\phi+$ and $\phi-$, which thus produce a substantial direct-current output-voltage, but only when one of the phase-fault magnetic amplifiers 51, 52 or 53 has become saturated in response to a phase-fault in the first, second or third zone, as the case may be.

It is frequently desirable to provide some sort of ground-fault detector or relay, a simple form of which is indicated at 8 in my drawing. Again, there are various forms of ground-fault relaying-protection, which are known, any one of which could be used in my invention. Some of these ground-fault protective-systems respond to distance, or impedance, or reactance, and some respond only to a particular current-magnitude, or to any one of several selected magnitudes of the ground-fault current, indicating different severities or distances of the ground-fault condition. In selecting a simple ground-fault relay 8, such as would suffice for a large number of the protective systems which are commonly used for power-line protection, I do not wish to exclude my invention from the possibility of using more elaborate ground-fault protection.

The illustrated ground-fault relay 8 is simply an over-current zero-phase-sequence relay, which is energized from an auxiliary non-saturated (or saturated) current-transformer CT4, which is connected in the neutral circuit of the line current-transformer CT. Since my static switching-devices respond to direct-current voltages, rather than alternating currents, I convert the secondary current of the auxiliary current transformer CT4 to a direct-current voltage, by means of a ballast-resistance 61 and a rectifier-bridge 62. The direct-current output-terminals of this bridge 62 are connected to the previously described output-terminals $\phi+$ and $\phi-$ of the phase-fault bridge 60, so that, even though the phase-fault bridge 60 is not energized with any substantial alternating-current input, nevertheless, if there is a ground-fault, the ground-fault bridge 62 will be energized and will produce an operative direct-current voltage in the control-circuit terminals $\phi+$ and $\phi-$.

If there is sufficient power in the control-circuit terminals $\phi+$ and $\phi-$, these terminals could be used to directly energize the trip-circuit of the circuit breaker CB. Ordinarily, however, it is not convenient to provide that much power in these control-circuit terminals $\phi+$ and $\phi-$, by means of the apparatus which I have described. As pointed out at the outset of this description, there are advantages in performing the line-fault discriminating-functions at an energy-level which is much lower than the energy-level which is needed for even the most sensitive of tripping mechanisms. These advantages include the possibility of using equipment having an extremely low power-consumption, which obviates the necessity for fuses in the secondary wiring-circuits, or control-circuit breakers, or special or elaborate potential-networks for handling the relaying-voltage which is obtained from a capacitor-tap or a bushing-tap, besides perhaps other advantages.

It is frequently desirable, therefore, to provide a final amplifying-stage which converts the tripping-intelligence which is contained in the effective energization of the control-circuit terminals $\phi+$ and $\phi-$, into a tripping-impulse of ample power for effectively energizing the trip-coil TC of the circuit breaker CB. To this end, I provide a tripping-amplifier 10, which is another magnetic amplifier, deriving its output-power, or controlled-circuit power, from the single-phase buses AC and N1, and controlled by means of the control-circuit having the terminals $\phi+$ and $\phi-$. The actual tripping-power could be either single-phase or direct-current, but since most tripping-circuits operate more quickly on direct-current energization than on alternating current, and since the magnetic amplifier of the tripping amplifier 10 is provided with a serially connected rectifier-bridge 70, in any event, (in order to provide the external series feed-back for the magnetic amplifier), it is usually desirable to energize the trip-coil leads TC1 and TC2 from the direct-current terminals of the rectifier-bridge 70, preferably in series-circuit relation to the feed-back coils of the magnetic amplifier 10.

The operation and advantages of my invention have been adequately explained during the progress of the description, as well as in the preliminary remarks, so that no further summarization is believed to be needed at this point. I wish to emphasize that I am not limited to any particular protective-relaying system, in the application of my low-energy, self-contained, completely line-energized, completely static, equipment. In this connection, I would point out that protective relaying systems are known, in which the directional functions and the fault-detection or distance-discriminating functions are combined in a single element, or in which the directional control is used to incapacitate the distance or fault-detecting elements, when the line-current direction is wrong, instead of being in effect serially connected with the distance-responsive or fault-detection equipment, in the tripping-circuit, as in my illustrated form of embodiment of my invention. These and other changes and substitutions are contemplated within the purview of the broader aspects of my invention, as well as the omissions of various parts which may not be needed in any particular installation, or the addition of more parts, for performing more functions or services or safeguards, as will be readily understood by those skilled in the art.

I claim as my invention:

1. A self-energized static protective-relay equipment, for protecting an alternating-current power-line against faults, said equipment being characterized by: a voltage source-means for supplying said equipment with an alternating-current voltage-input in response to a line-voltage; a current source-means for supplying said equipment with an alternating-current current-input in response to a line-current; said equipment having no other power-input means; an internally energized static means for deriving output-circuit energy from said current source-means; a plurality of static switching-devices, each of which is operative to either substantially block or permit current-flow of said output-circuit energy; an internally energized static means for producing unidirectional-current control for a first one of said static switching-devices in response to an aspect of a line-fault condition; an internally energized static means for producing unidirectional-current control for another of said static switching-devices in response to another aspect of a line-fault condition; and a circuit-means energized from said output-circuit energy-means for providing an output relay-circuit which is responsive to both of said static switching-devices.

2. A self-trip circuit breaker having a trip-coil, and having a self-contained protective relaying equipment as defined in claim 1, said trip-coil being energized from the output-circuit, and the circuit breaker being adapted to be connected in the power-line which is being protected.

3. A self-energized static protective-relay equipment, for protecting a power-line against faults, said equipment being characterized by: a power-line circuit-interrupting means having a trip-coil requiring current of a certain energy-level for its effective energization; a voltage source-means for supplying said equipment with a voltage-input in response to a line-voltage; a current source-means for supplying said equipment with a current-input in response to a line-current; said equipment having no other power-input means; an internally energized static means for effecting a line-fault discrimination at a low energy-level; and an internally energized static amplifying-means for amplifying the output of said fault-discrimination means to an energy-level which is effective in said trip-coil and for applying said output to said trip-coil.

4. A completely line-energized static protective relaying equipment, for protecting a power-line against faults, said equipment including: a completely line-energized static energy-source means, having at least one voltage of an operative magnitude, at least during times when a line-current has a fault-magnitude; at least three completely line-energized, separately controllable, static switching-devices, each operative to provide a circuit-portion in which a current-flow from said energy-source means is controlled according to the manner in which that static switching-device is controlled; a completely line-energized static control-means, for controlling a first one of said static switching-devices in such manner as to produce a response to a predetermined aspect of a line-fault condition; a second completely line-energized static control-means, for controlling a second one of said static switching-devices in such manner as to produce a response to another predetermined aspect of a line-fault condition; and a third completely line-energized static control-means, responsive to the controlled-current portions of both said first and second static switching-devices, for causing a third one of said static switching-devices to either substantially block or permit a material output-current flow from said energy-source means in accordance with the condition of said first and second static switching-devices.

5. A self-trip circuit breaker having a trip-coil, and having a self-contained protective relaying equipment as defined in claim 4, said trip-coil being energized from the controlled output-circuit of said third static switching-device, and the circuit breaker being adapted to be connected in the power-line which is being protected.

6. A completely line-energized static protective relaying equipment, for protecting an alternating-current power-line against faults, said equipment including: a voltage source-means for supplying said equipment with an alternating-current voltage-input in response to a line-voltage; a current source-means for supplying said equipment with an alternating-current current-input in response to a line-current; said equipment having no other power-input means; a completely internally energized static energy-source means, for providing a constant-voltage source having a voltage which is reasonably constant whenever a line-current value is of a fault-magnitude; a plurality of separately controllable, static switching-devices, each operative to provide a circuit-portion in which a current-flow from said constant-voltage source is either substantially blocked or permitted, according to the manner in which that static switching-device is controlled; a completely internally energized static circuit-means deriving output-circuit energy from said energy-source means, under the control of a plurality of said static switching-devices; and a plurality of completely internally energized static means for producing a different unidirectional-current control for each of the respective static switching-devices whereby each static switching-device is responsive to a different aspect of a line-fault condition.

7. A self-trip circuit breaker having a trip-coil, and having a self-contained protective relaying equipment as defined in claim 6, said trip-coil being energized from the controlled output-circuit and the circuit breaker being adapted to be connected in the power-line which is being protected.

8. A self-energized static protective-relay equipment, for protecting a power-line against faults, said equipment being characterized by: a power-line circuit-interrupting means having a trip-coil requiring current of a certain energy-level for its effective energization; a voltage source-means for supplying said equipment with a voltage-input in response to a line-voltage; a current source-means for supplying said equipment with a current-input in response to a line-current; said equipment having no other power-input means; relaying-energy means for deriving a low-energy source of relaying voltage and a low-energy source of relaying current from said voltage source-means and said current source-means, respectively; a static means, energized from said relaying-energy means, for effecting a line-fault discrimination at a low energy-level; and an internally energized static amplifying-means for amplifying the output of said fault-discrimination means to an energy-level which is effective in said trip-coil and for applying said output to said trip-coil.

9. A completely line-energized static protective relaying equipment, for protecting a power-line against faults, said equipment including: an energy-input means, which exclusively consists of a voltage source-means for supplying said equipment with electrical energy in response to a line-voltage, and a current source-means for supplying said equipment with electrical energy in response to a line-current; a static energy-source means, completely energized from said energy-input means, and having at least one voltage of an operative magnitude, at least during times when a line-current has a fault-magnitude; and a static switching device, completely controlled jointly by said voltage source-means and said current source-means, for either substantially blocking or permitting a material output-current flow from said energy-source means in accordance with the absence or presence of a predetermined relationship between said voltage and current source-means, said static switching-device including: a relay-type saturable magnetic amplifier having a means for triggering the same in response to a predetermined magnitude and polarity of control voltage; and a biasing-means for said magnetic amplifier, for preventing self-triggering because of self-saturation, said biasing means including a static biasing-source means, completely energized from said energy-input means, said biasing-source means providing a unidirectional biasing-voltage which is reasonably constant, at least during times when a line-current has a fault-magnitude; said invention being further characterized by said energy-source means producing a single-phase voltage for supplying the output-circuit of said magnetic amplifier.

10. A completely line-energized static protective relaying equipment, for protecting a power-line against faults, said equipment including: an energy-input means, which exclusively consists of a voltage source-means for supplying said equipment with electrical energy in response to a line-voltage, and a current source-means for supplying said equipment with electrical energy in response to a line-current; a static energy-source means, completely energized from said energy-input means, and having at least one voltage of an operative magnitude, at least during times when a line-current has a fault-magnitude; and a static switching device, completely controlled jointly by said voltage source-means and said current source-means, for either substantially blocking or permitting a material output-current flow from said energy-source means in accordance with the absence or presence of a predetermined relationship between said voltage and current source-means, said static switching-device including: a relay-type saturable magnetic amplifier having a means for triggering the same in response to a predetermined magnitude and polarity of control-voltage; and a biasing means for said magnetic amplifier, for preventing self-triggering because of self-saturation, said biasing-means including a static biasing-source means, completely energized from said energy-input means, said biasing-source means providing a unidirectional biasing-voltage which is reasonably constant, at least during times when a line-current has a fault-magnitude; said invention being further characterized by said energy-source means producing a single-phase voltage for supplying the output-circuit of said magnetic amplifier; in combination with a closed damper-coil control-circuit for said magnetic amplifier, said closed damper-coil control-circuit including an impedance suitable for providing a protective-relay backup timing in the response of said magnetic amplifier.

11. A completely line-energized static protective relaying equipment, for protecting a power-line against faults, said equipment including: an energy-input means, which exclusively consists of a voltage source-means for supplying said equipment with electrical energy in response to a line-voltage, and a current source-means for supplying said equipment with electrical energy in response to a line-current; a static energy-source means, completely energized from said energy-input means, and having at least one voltage of an operative magnitude, at least during times when a line-current has a fault-magnitude; and a static switching-device, completely controlled jointly by said voltage source-means and said current source-means, for either substantially blocking or permitting a material output-current flow from said energy-source means in accordance with the absence or presence of a predetermined relationship between said voltage and current source-means, said static switching-device including: a relay-type saturable magnetic amplifier having a means for triggering the same in response to a predetermined magnitude and polarity of control-voltage; and a biasing-means for said magnetic amplifier, for preventing self-triggering because of self-saturation, said biasing-means including a static biasing-source means, completely energized from said energy-input means, said biasing-source means providing a unidirectional biasing-voltage which is reasonably constant, at least during times when a line-current has a fault-magnitude; said invention being further characterized by said energy-source means producing a single-phase voltage for supplying the output-circuit of said magnetic amplifier, the joint-current-and-voltage-controlled magnetic amplifier including such control as to secure a response of said magnetic amplifier to a predetermined direction of the power-line current.

12. A completely line-energized static protective relaying equipment, for protecting a power-line against faults, said equipment including: an energy-input means, which exclusively consists of a voltage source-means for supplying said equipment with electrical energy in response to a line-voltage, and a current source-means for supplying said equipment with electrical energy in response to a line-current; a static-energy-source means, completely energized from said energy-input means, and having at least one voltage of an operative magnitude, at least during times when a line-current has a fault-magnitude; and a static switching-device, completely controlled jointly by said voltage source-means and said current source-means, for either substantially blocking or permitting a material output-current flow from said energy-source means in accordance with the absence or presence of a predetermined relationship between said voltage and current source-means, said static switching-device including: a relay-type saturable magnetic amplifier having a means for triggering the same in response to a predetermined magnitude and polarity of control-voltage; and a biasing means for said magnetic amplifier, for preventing self-triggering because of self-saturation, said biasing-means including a static biasing-source means, completely energized from said energy-input means, said biasing-source means providing a unidirectional biasing-voltage which is reasonably constant, at least during times when a line-current has a fault-magnitude; said invention being further characterized by said energy-source means producing a single-phase voltage for supplying the output-circuit of said magnetic amplifier, the joint-current-and-voltage-controlled magnetic amplifier including such control as to secure a response of said magnetic amplifier to a predeterminedly low impedance of the power-line.

13. A completely line-energized static protective relaying equipment, for protecting a power-line against faults, said equipment including: an energy-input means, which exclusively consists of a voltage source-means for supplying said equipment with electrical energy in response to a line-voltage, and a current source-means for supplying said equipment with electrical energy in response to a line-current; a static energy-source means, completely energized from said energy-input means, and having at least one voltage of an operative magnitude, at least during times when a line-current has a fault-magnitude; and a static switching device, completely controlled jointly by said voltage source-means and said current source-means, for either substantially blocking or permitting a material output-current flow from said energy-source means in accordance with the absence or presence of a predetermined relationship between said voltage and current source-means, said static switching-device including: a relay-type saturable magnetic amplifier having a means for triggering the same in response to a predetermined magnitude and polarity of control-voltage; and a biasing-means for said magnetic amplifier, for preventing self-triggering because of self-saturation, said biasing-means including a static biasing-source means, completely energized from said energy-input means, said biasing-source means providing a unidirectional biasing-voltage which is reasonably constant, at least during times when a line-current has a fault-magnitude; said invention being further characterized by said energy-source means producing a single-phase voltage for supplying the output-circuit of said magnetic amplifier, the joint-current-and-voltage-controlled magnetic amplifier including: a unidirectional operating control-voltage which is responsive to a line-current which is representative of the fault-condition on the power-line; and an oppositely directed restraining control-voltage which is responsive to a line-voltage which is representative of the fault-condition on the power-line; whereby the magnetic amplifier responds to a predeterminedly low impedance of the power-line.

References Cited in the file of this patent

UNITED STATES PATENTS

| | | |
|---|---|---|
| 2,479,345 | Goldsborough | Aug. 16, 1949 |
| 2,504,827 | Goldsborough | Apr. 18, 1950 |
| 2,542,809 | Goldsborough | Feb. 20, 1951 |
| 2,545,995 | Goldsborough | Mar. 20, 1951 |
| 2,573,249 | Dahlgren | Oct. 30, 1951 |
| 2,594,022 | Horton | Apr. 20, 1952 |